TELEPHONE INTERCEPT BRIDGE

Filed June 22, 1956 2 Sheets-Sheet 1

INVENTOR.
ROY PERKIN
BY
Christie, Parker & Hale
ATTORNEYS

Aug. 26, 1958 R. PERKIN 2,849,700

TELEPHONE INTERCEPT BRIDGE

Filed June 22, 1956 2 Sheets-Sheet 2

INVENTOR.
ROY PERKIN

BY Christie, Parker & Hale

ATTORNEYS

United States Patent Office 2,849,700

Patented Aug. 26, 1958

2,849,700

TELEPHONE INTERCEPT BRIDGE

Roy Perkin, Monterey Park, Calif., assignor to General Telephone Company of California, Santa Monica, Calif., a corporation of California Application June 22, 1956, Serial No. 593,188

3 Claims. (Cl. 339—198)

This invention relates to a new circuit bridge for use in dial type telephone circuits and provides an inexpensive device by which telephone calls to disconnected telephones may be intercepted by the operator.

The invention eliminates time-consuming and costly manual operations previously used in making the necessary connections so that telephone calls to a temporarily disconnected telephone would be intercepted by the operator. In practice it has been found that out of every ten thousand telephones in service, approximately two hundred and fifty of them will be temporarily disconnected. Calls coming in to these temporarily disconnected telephones are intercepted in order that the operator may inform the caller as to the reason he cannot reach the number he has called. To accomplish an interception of a call to a disconnected telephone, it has heretofore been the practice to wire between terminals to which a subscriber's telephone had previously been connected and terminals leading to the operator trunk line.

Such practice involved considerable labor and was therefore expensive. In addition, when service was resumed, removal of the wiring between the terminals leading to the disconnected telephone and the terminals leading to the operator trunk line often caused broken bits of wire to fall down between the terminal pins, thereby causing hard-to-find short circuits. By use of my invention, labor time in making a connection for operator intercept is considerably shortened and the possibility of forming accidental short-circuits is materially reduced.

My invention comprises an intercept bridge which has a non-conductive back. The bridge is adapted to attach to a telephone terminal by means of conductive clips which are attached to the back and which fit a set of terminal pins in a normal block. Six clips are provided—one for each of three terminals connected to a cable leading to a subscriber's telephone, and one for each of three terminals connected to an operator trunk line. The clips are interconnected so that with the intercept bridge in place an incoming call on a particular telephone terminal will ring the operator and a person making the call will be able to talk to the operator or will be able to hear a recording giving the person certain information concerning the disconnected telephone.

These and other aspects of my invention will be more fully understood in the light of the following detailed description made in conjunction with the accompanying drawings, in which.

Figure 1:
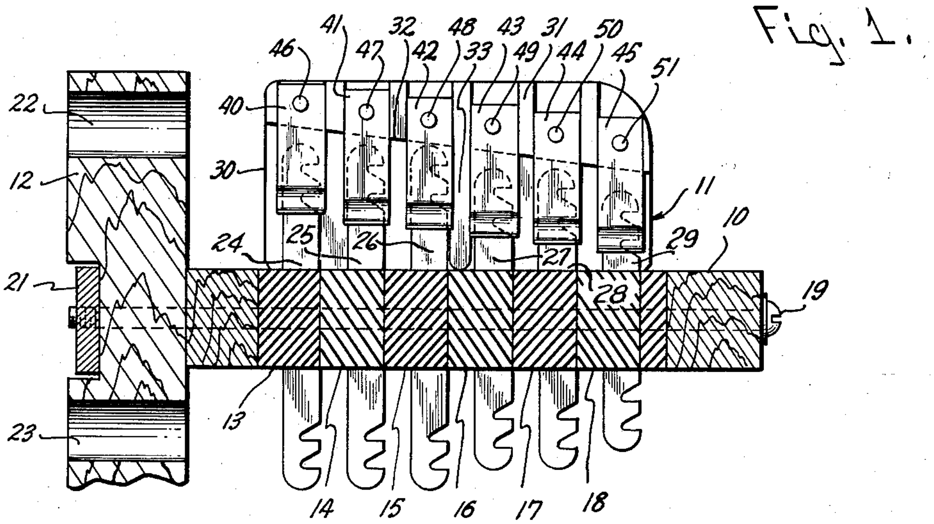
Fig. 1 is an elevation view of a terminal block, partly in section, showing a preferred form of intercept bridge in place.

Referring to Fig. 1, a typical normal block or terminal block 10 is shown with a preferred form of my intercept bridge 11 in place. The terminal block comprises a jumper fanning strip 12 to which insulating separators 13, 14, 15, 16, 17, 18 are fastened. The separators are laid side-by-side and held at a right angle to the jumper fanning strip by bolts 19, 20 (see Fig. 2) which extend through the separators and the jumper fanning strip and are threaded into a bolt bar 21. The jumper fanning strip contains jumper holes, such as illustrated by reference characters 22 and 23, so that wires (not shown) may be brought through the strip.

Figure 2:
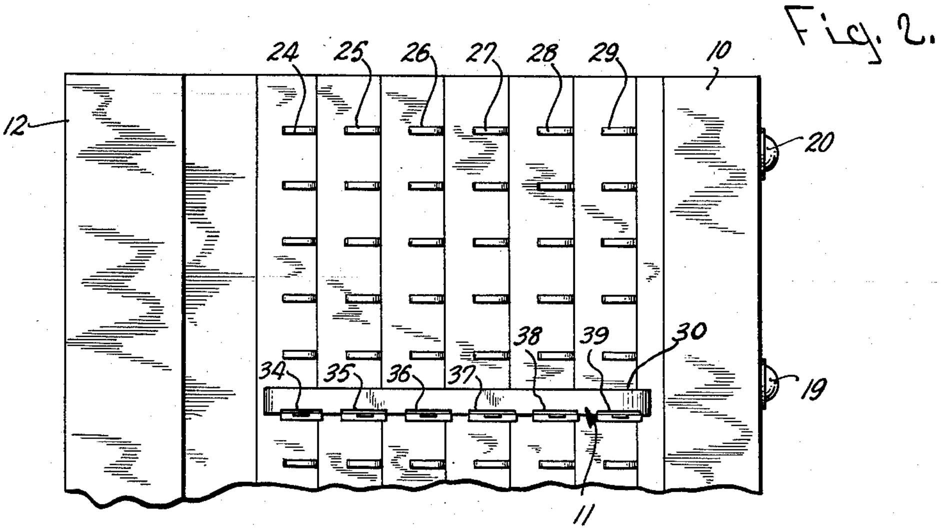
Fig. 2 is a fragmentary plan view of a terminal block with a preferred form of intercept bridge in place.

As shown in Fig. 2, six terminal pins exemplified by reference characters 24, 25, 26, 27, 28, 29 are placed in rows extending outward from the jumper fanning strip. The pins are mounted and held in position by slots in the separators. When a subscriber's telephone is connected for normal service, as will be pointed out in more detail in the discussion of Fig. 5, the top portions of the three long terminals (see Fig. 1) which are called connector terminals 24, 25, 26 are connected to the subscriber's telephone by means of suitable wires (not shown). The portions of the three connector terminals 24, 25, 26 below the separators are connected by wires (not shown) to a central office switching system (not shown). The lower portions of the three shorter terminals (see Fig. 1) which are called intercept terminals 27, 28, 29 are connected by suitable leads (not shown) to an intercept system (not shown). When a call is made to a telephone that has been temporarily disconnected, it is necessary to connect the call to the operator. This connection is accomplished by means of the intercept bridge 11 which I have invented.

A front elevation view of the bridge mounted in place on a typical row of terminal pins is shown in Fig. 1. The bridge comprises an insulator back 30 made of non-conducting material such as Lucite. Formed integrally with the insulator back is a wedge-shaped flat boss 31 which has a thickness at least equal to that of the terminal pins and forms a shoulder 32 at an angle across the face of the insulator back. The shoulder is angled so that when the bridge is in place on a row of terminal pins, the shoulder will clear the terminal pins. This important feature of the invention makes it impossible to mount the bridge backwards and thus prevents making wrong connections when the bridge is mounted on a row of terminal pins.

Also formed as an integral part of an insulator back is a guide tongue 33, preferably of the same thickness as the shoulder. The tongue is narrower than the distance between adjacent pins and extends from the center of the shoulder to the bottom edge of the bridge. Thus, as the bridge is placed on a row of terminal pins, the tongue slides between the two middle terminal pins in a row on which the bridge is mounted, and serves to guide the bridge onto the pins and hold it laterally in position.

Figure 3:
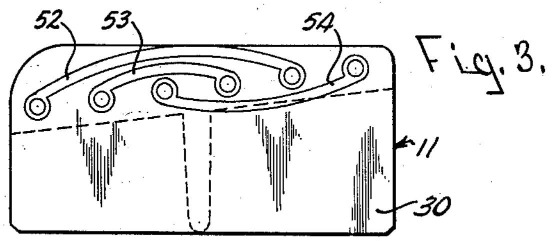
Fig. 3 is a rear elevation of a preferred form of intercept bridge.

As shown in Fig. 2, the boss is provided with six parallel recesses 34, 35, 36, 37, 38, 39. In each recess is a metallic spring clip 40, 41, 42, 43, 44, 45 which is attached to the insulator back by means of rivets 46, 47, 48, 49, 50, 51. Referring now to Fig. 3, three conductors 52, 53, 54 are printed on the insulator back. The ends of the conductors encircle the holes through which the rivets pass. Thus, each rivet serves the additional function of conductively connecting the clip which the rivet attaches to the boss, to an end of one of the conductors on the insulator back.

As shown in Fig. 1, clip 40 is connected to clip 43 by means of conductor 52; clip 41 is connected to clip 45 by means of conductor 53; and clip 42 is connected to clip 44 by means of conductor 54. When the terminal pins are thus connected, the bridge is used for operator intercept. However, the apparatus of my invention is also adaptable to any other interconnection of the pins leading to a subscriber's telephone and the pins leading to the operator trunk line, such as may be required when it is necessary to connect the pins for manual intercept.

Figure 4:
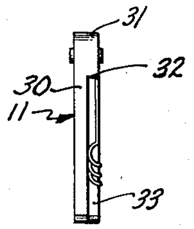
Fig. 4 is an end elevation of a preferred form of intercept bridge.

Each spring clip is made from metal, such as Phosphor bronze, so that it will act as a spring. The clips are flat strips except for one end which is stamped in the form of a segment of a cylinder (see Fig. 4). The flat portion of each clip is riveted in one of the recesses in the box. The convexly curved surface of the stamped end bears against the insulator back. When the bridge is placed on a row of pins after the three wires leading to a subscriber's telephone have been removed from the top portions of the connector terminals, the curvature in the stamped end is sufficient to ride over the terminal pins and the spring tension in the clips holds the convexly curved surface of each clip against a corresponding terminal pin so long as the bridge is in position on a row of pins.

Figures 5, 6:
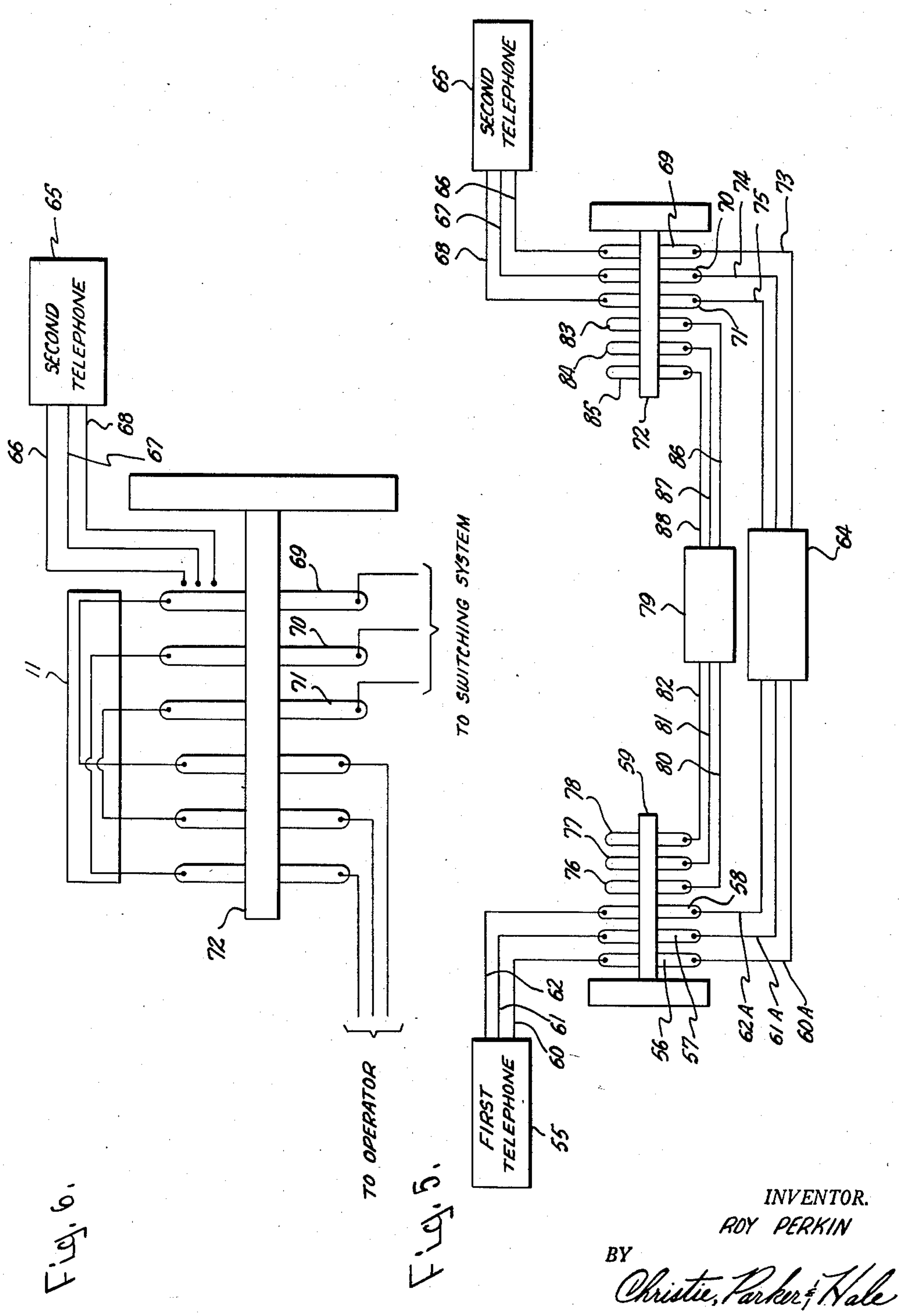
Fig. 5 is a schematic diagram of a telephone circuit.
Fig. 6 is a partial schematic diagram of a telephone circuit with the intercept bridge in place.

Fig. 5 shows a schematic telephone circuit between two telephones. Three wires lead from a first telephone 55 to the connector terminal pins 56, 57, 58 in a first terminal block 59. The "sleeve" or "supervision" wire 60 is connected to the top portion of terminal pin 56. The "ring" wire 61 is connected to the top portion of terminal pin 57, and the "tip" wire 62 is connected to the top portion of terminal pin 58. By three wires 60A, 61A, 62A attached one to each bottom portion of the three connector terminal pins, the "sleeve," "ring," and "tip" wires from the first telephone are connected to a central office switching system 64. A second telephone 65 is wired to the switching system in the same manner: a "sleeve" wire 66, a "ring" wire 67 and a "tip" wire 68 are connected between the second telephone and the top portions of three connector terminal pins 69, 70, 71 in a second terminal block 72; three wires 73, 74, 75 are connected from the bottom portions of the three connector terminal pins 69, 70, 71 to the switching system, thus completing the connection of the "sleeve," "ring" and "tip" wires from the second telephone to the switching system.

The lower portions of three intercept terminal pins 76, 77, 78 on the first terminal block are connected to an intercept system 79 by three wires 80, 81, 82. Similarly, the lower portions of three intercept terminal pins 83, 84, 85 on the second terminal block are connected to the intercept system by three wires 86, 87, 88. In each case a single wire to only one pin is the way in which the connections are made from the terminal block to the intercept system.

By means of the circuitry of Fig. 5, a call from the first telephone reaches the second telephone after the dialing pulses from the first telephone cause the central office switching system to make the necessary connections between the wires leading in to the switching system from the first terminal block and the wires leading from the switching system to the second terminal block.

Fig. 6 shows schematically the circuitry of the second terminal block of Fig. 5 as modified for operator intercept of calls to the second telephone. The three wires 66, 67, 68 leading from the second terminal block 72 to the second telephone 65 have been disconnected from the three connector terminal pins 69, 70, 71. By means of the interconnection of the connector terminal pins and intercept terminal pins accomplished by merely placing my intercept bridge on the row of terminal pins in the second terminal block, calls directed to the disconnected second telephone are connected to the intercept system.

Thus, by simply sliding an intercept bridge over a row of pins, calls directed to a disconnected telephone are intercepted by the operator as long the bridge remains in place. When it becomes necessary to remove the temporary disconnection of a subscriber's service, the only operation required is the easy removal of the intercept bridge and re-connection of the wires to the disconnected telephone.

I claim:

1. For use in a telephone distribution circuit having a terminal block in which at least one row of terminal pins is affixed and so that each said terminal pin is insulated from the other pins and spaced a given distance from each adjacent terminal pin, the combination comprising an insulator back having a given flat face, a plurality of parallel contact spring clips being attached to the face and spaced one from the other and being adapted to hold the terminal pins against the face, each of the contact clips being adapted to form a conductive connection with a given terminal pin, means for forming a conductive connection between at least two predetermined contact clips, a guide tongue affixed to the face between two adjacent clips and having a given width which is less than the distance between adjacent terminal pins, said guide tongue being parallel to the clips.

2. For use in a telephone distribution circuit having a terminal block in which at least one row of terminal pins is affixed and each said terminal pin is insulated from the other pins and spaced a given distance from each adjacent terminal pin, the combination comprising an insulator back having a flat face and a straight bottom edge, a boss formed integrally with the back to form a shoulder which extends across the face at a given angle to the bottom edge, a plurality of parallel contact spring clips being attached to the boss at right angles to the bottom edge and spaced one from the other, each of the contact clips being adapted to form a conductive connection with a given terminal pin, means for forming conductive connections between predetermined contact clips, a guide tongue having a given axis and being integrally formed with the back between two adjacent clips and having a given width which is less than the distance between adjacent terminal pins, the axis of said guide tongue being at a right angle to the bottom edge.

3. For use in a telephone distribution circuit having a terminal block in which at least one row of six terminal pins is affixed and each said terminal pin is insulated from the other pins and spaced a given distance from each adjacent terminal pin, the combination comprising an insulator back having a flat face and a straight bottom edge, a boss formed integrally with the back to form a shoulder which extends across the face at a given angle to the bottom edge, six contact spring clips being attached to the boss in a row and spaced one from the other, each of the contact clips being adapted to form a conductive connection with a given terminal pin when the bridge is placed on a row of pins, means for forming conductive connections between predetermined pairs of contact clips, a guide tongue on the face, said guide tongue being integrally formed with the back between two adjacent clips having a given axis and having a width which is less than the distance between adjacent terminal pins, the axis of said guide tongue being at a right angle to the bottom edge.

References Cited in the file of this patent

UNITED STATES PATENTS

| | | |
|---|---|---|
| 1,162,996 | Farrelly et al. | Dec. 7, 1915 |
| 1,423,228 | Leachman | July 18, 1922 |
| 1,537,081 | Graham | May 12, 1925 |